Oct. 11, 1966     C. B. EBERMAN     3,277,973
DRILL BIT
Filed May 14, 1964
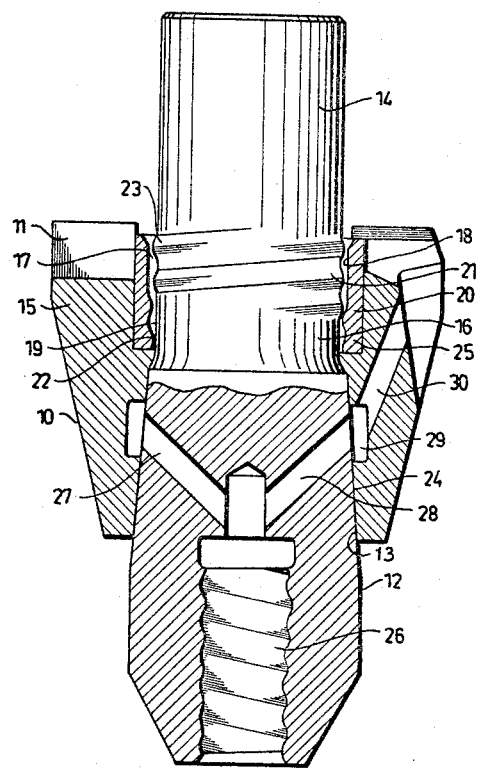

United States Patent Office 3,277,973
Patented Oct. 11, 1966

3,277,973
DRILL BIT
Carl Börje Eberman, Sandviken, Sweden, assignor to Sandvikens Jernverks Aktiebolag, Sandviken, Sweden, a corporation of Sweden
Filed May 14, 1964, Ser. No. 367,373
Claims priority, application Sweden, May 14, 1963, 5,298/63
8 Claims. (Cl. 175—407)

The present invention relates to a drill bit of the reaming type intended for percussion drilling and comprises a rod part, the fore portion of which is shaped as a pilot peg, and a sleeve part having cutting inserts and a central hole for receiving said rod part, said sleeve part being mounted on said rod part to the rear of said pilot peg, an internal conical portion of said central hole in said sleeve part being in engagement with a matching external conical portion on said rod part.

Such reaming bits are known in the art but have hitherto been afflicted with certain disadvantages relating to the fastening of the sleeve part on the rod part. Sometimes the sleeve part is disengaged during drilling from the frictional engagement between said conical portions and is detached from the drill and remains in the drill hole. This causes much trouble and implies either that the sleeve part is lost and the further drilling of the hole is made impossible by the sleeve part stuck therein, or that valuable time has to be spent in fishing out the lost sleeve part from the drill hole. An earlier suggestion for solving this problem is to weld a locking ring on the peg thereby preventing the sleeve part from falling off the drill rod during drilling. This solution has the substantial drawback that the sleeve part can not be detached for performing the necessary re-sharpening without cutting off the ring from the pilot peg.

The present invention presents a solution to the said problem and provides a reaming bit which is simple to manufacture and has been found effective in the above mentioned and also other respects. The bit according to the invention has an internal thread situated on the sleeve part and a matching external thread situated on the rod part in front of said internal thread. The threads are out of engagement with each other during drilling. In case the sleeve part should be detached from its frictional mounting on the conical portion of the rod part, the threads constitute a stop so that the sleeve part is not completely detached from the drill rod but can be extracted from the hole together with the drill rod. In order to separate the sleeve part from the rod part the parts must be screwed along each other. The direction of the thread should be such that the sleeve part can not be screwed off the rod part by the rotation of the drill during drilling.

Closer details of the invention appear from the following specification and the appended drawing, which shows a longitudinal section of a drill bit according to an embodiment of the invention.

The drill bit comprises a sleeve part 10 having cutting inserts 11, preferably of sintered hard material as sintered carbide, and having a central hole for receiving a rod part 12 having a conical portion 13. The sleeve part 10 has an internal conical surface 24 matching the conical portion 13, and the frictional engagement between the conical surfaces provide and easily detachable coupling between the parts 10 and 12.

The rod part 12 protrudes from the sleeve part 10 providing the pilot peg 14. This peg has suitably the cylindrical shape shown in the drawing but it can alternatively have other shapes in order to facilitate its protrusion, and is intended to guide the drill along a previously drilled narrow pilot hole into whe the pilot peg fits, the cutting edges or the sleeve part cutting a larger hole i.e. reaming the pilot hole. In certain cases the pilot peg 14 may be provided with cutting inserts in order to cut through loose material in the pilot hole or to make it possible to drill without a previously made pilot hole. The sleeve part 10 comprises a fore portion 15 protruding in front of the conical part 24 along a middle portion 16 of the rod part between the pilot peg 14 and the conical portion 13. The fore portion 15 of the sleeve part is coaxial with the rod part and spaced therefrom by an annular space 17, which is open in the forward direction and defined by the surface 18 on the sleeve part and the surface 19 on the rod part. The rear part 22 of the surface 18 is provided with an internal thread 20 and the fore part 23 of the surface 19 is provided with an external thread 21. The threads match each other, but when the sleeve part 10 is in drilling position on the rod part 12 and the conical surfaces 13 and 24 are in engagement with each other, the external thread 21 is situated axially in front of the internal thread 20, so that the threads are out of engagement with each other. In mounting the sleeve part on the rod part the thread 20 must be screwed along the thread 21 and past the rear end thereof, and in order to separate the sleeve part from the rod part the threads must be engaged with each other and the sleeve part screwed out along the rod part. The threads thus form a locking so that the sleeve part does not remain in the drill hole in case the frictional engagement between the sleeve part and the rod part should be loosened. The threads should not be in engagement with each other during the drilling but the sleeve part should be supported on the rod part exclusively at the matching conical surfaces 13 and 24 in order to secure a firm support of the sleeve part on the rod part, so that the sleeve part cannot rock during the drilling and an effective transfer of the percussion energy from the drill rod to the cutting edges is obtained. The threads should be out of engagement also in order to facilitate a deliberate detaching of the sleeve part for instance in order to resharpen the cutting edges.

It has been found suitable to make the threads 20 and 21 rounded, forming a wave shaped longitudinal section, and also to have them rather short, one or two turns. The direction of the thread should be such that the sleeve part is not screwed off the rod part by the rotation of the drill rod in case the sleeve part should become disengaged from its conical support during drilling. Usually the rotation in drilling machines is directed in such a way that the thread should be a left hand thread. The thread 20 on the sleeve part must of course have an inner diameter that is greater than the outer diameter of the peg 14. In the drawing the external thread 21 is situated within the annular space 17 which has the advantage that the threads are protected against wear from the cuttings arising from the drilling, but if desirable the thread 21 could be situated more or less in front of the annular space. The drawing further shows a separate bushing 25 on which the internal thread 20 is situated. This bushing can be fastened to the sleeve part 10 by brazing. Alternatively the bushing can be omitted and the threads be made in the body of the sleeve part.

Sometimes it can be suitable to have radially directed openings (not shown) between the annular space 17 and the periphery of the sleeve part in order to permit removal of cuttings which gather in the annular space. The rear threaded bore 26 is intended for attaching the drill bit to a drill rod (not shown) having a matching external thread. The channels 27 and 28 serve the purpose of transporting flushing medium, usually air or water, from a central flushing channel in the drill rod to an annular recess 29 in the conical surface 24 and further through channels 30 to the fore part of the bit. The recess 29 forms a release for obtaining a firm and stable contact between the foremost and rearmost parts of the conical surfaces, so that a firm axial alignment between the sleeve part and the rod part is obtained.

I claim:

1. Drill bit of the reaming type for percussion drilling comprising a rod part the fore portion of which is shaped as a pilot peg and a sleeve part having cutting edges at its front around said pilot peg and a central hole for receiving said rod part, said rod part having a forwardly tapering conical portion to the rear of said pilot peg and said central hole in said sleeve part having a rearwardly tapering matching conical internal surface for supporting said sleeve part on said rod part by engagement between said conical surfaces, a fore portion of said sleeve part being separated from said rod part by an annular space and the inner surface of said bore in said sleeve part having an internal thread within said annular space matching an external thread on said rod part, said internal thread being positioned axially to the rear of and out of engagement with said external thread when said sleeve part is in operating position with its conical surface in contact with the conical surface on said rod part.

2. Drill bit according to claim 1 in which the threads are rounded.

3. Drill bit according to claim 1 in which the annular space is open in the forward direction.

4. Drill bit according to claim 1 in which the external thread is situated within the annular space.

5. Drill bit according to claim 1 in which the sleeve part is provided with a bushing within the central bore, said bushing carrying said internal thread and being fastened to the sleeve part.

6. Drill bit according to claim 1 in which the threads are relatively short and comprise up to two turns.

7. Drill bit according to claim 1 in which the threads are directed in such a way that the sleeve part in case of engagement between the threads is screwed rearwardly on the rod part by the normal rotation of the drill rod.

8. Drill bit according to claim 1 in which the pilot peg is provided with at least one cutting edge.

References Cited by the Examiner
UNITED STATES PATENTS

| 48,914 | 7/1865 | Dickey | 175—389 |
|---|---|---|---|
| 1,848,192 | 3/1932 | Newman | 175—421 X |
| 2,099,677 | 11/1937 | Cunningham | 175—420 X |
| 2,147,343 | 2/1939 | Hokanson | 287—126 |
| 2,739,791 | 3/1956 | Dimitrieff | 175—407 |

CHARLES E. O'CONNELL, *Primary Examiner.*

N. C. BYERS, *Assistant Examiner.*